A. A. KLEMS.
GREASE CUP.
APPLICATION FILED JULY 1, 1918.

1,304,328.

Patented May 20, 1919.

INVENTOR.
Albert A. Klems.
BY Hazard & Miller
ATTORNEY.

UNITED STATES PATENT OFFICE.

ALBERT A. KLEMS, OF LOS ANGELES, CALIFORNIA, ASSIGNOR OF ONE-THIRD TO CHARLES E. BOWN, OF LOS ANGELES, CALIFORNIA.

GREASE-CUP.

1,304,328.

Specification of Letters Patent.    Patented May 20, 1919.

Application filed July 1, 1918. Serial No. 242,833.

*To all whom it may concern:*

Be it known that I, ALBERT A. KLEMS, a citizen of the United States, residing at Los Angeles, in the county of Los Angeles and State of California, having invented new and useful Improvements in Grease-Cups, of which the following is a specification.

My invention relates to grease cups and consists in the novel features herein shown, described and claimed.

My object is to make an improved grease cup to which a grease gun may be attached for forcing the grease to circulate under considerable pressure and having a check valve to hold the grease from running backwardly when the grease gun is disconnected.

Figure 1:
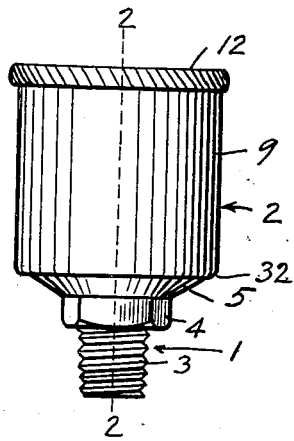
Figure 1 is a side elevation of a grease cup embodying the principles of my invention.
Figure 2:
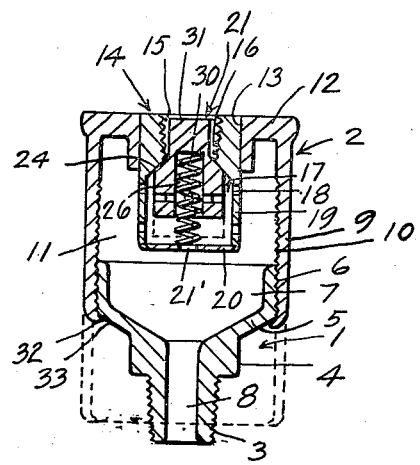
Fig. 2 is a vertical central section as seen on the line 2—2 of Fig. 1.
Figure 3:
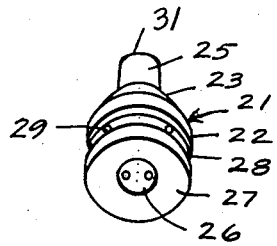
Fig. 3 is a perspective of the check valve plunger.
Figure 4:
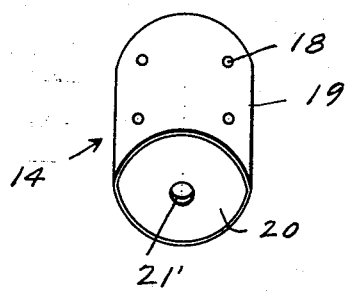
Fig. 4 is a perspective of the check valve casing.

The main frame of the grease cup consists of the stationary member 1 and the screw-compression member 2.

The stationary member 1 consists of an externally screw-threaded nipple 3 adapted to be screwed into the machine to be lubricated, the hexagonal head 4 upon the upper end of the nipple 3 and providing a wrench seat for screwing the grease cup into or out of place, and the chambered body 5 extending upwardly from the head 5 and having an external screw-thread 6, a chamber 7, and a passage 8 leading downwardly from the chamber through the head 4 and nipple 3.

The screw-compression member 2 comprises a cylindrical body 9 having an internal screw-thread 10 fitting upon the screw-thread 6 and a chamber 11 communicating with the chamber 7, and a head 12 closing the chamber 11; there being a central opening 13 through the head 12.

The check valve casing 14 is mounted in the opening 13 and consists of a cylindrical body having an axial bore 15 extending from its upper end; said bore being provided with screw-threads 16; and having an enlarged chamber 17 extending from its lower end and communicating with the bore 15. Ports 18 are formed radially in the shell 19 around the chamber 17. A circular head 20 is fitted into the lower end of the shell 19 and the shell 19 is spun or riveted to hold the head in place. A central bore 21' is formed through the head 20.

The check valve plunger 21 is placed in position before the head 20 is applied, and the check valve plunger comprises a cylindrical head 22 having a conical valve face 23 around its upper end; there being a valve seat 24 in the casing at the top of the chamber 17 against which the face 23 fits; and a stem 25 extending upwardly from the point of the valve face 23 and loosely filling the bore 15; there being a bore 26 extending from the lower end face 27 of the head 22 to form a spring seat and spring casing and there being an annular groove 28 in the periphery of the head 22 and radial ports 29 leading from the groove 28 to the bore 26. An expansive coil spring 30 is placed in the bore 26 and rests upon the head 20; the tension of the spring being exerted to hold the plunger elevated and the face 23 seated against the seat 24 to prevent the oil from running out of the grease cup from back pressure. The upper end 31 of the stem 25 is flush with the upper face of the head 12 when the plunger is seated.

After the check valve construction has been completed the member 2 is screwed upon the member 1 and the lower edge 32 of the cylinder 9 is spun around and inwardly to make a seat against which the beveled face 33 of the chambered body 5 will fit when the member 2 is screwed upwardly to make a tight joint so that the grease cup will not leak when the pressure of the grease gun is applied.

The grease gun will have a nipple to screw tightly into the thread 16 and when this nipple is screwed into place it will engage the face 31 and press the plunger 21 downwardly. Then as the grease gun is operated the grease will flow past the face 23 and seat 24, through the ports 18 and 21', and through the groove 28 and ports 29 to the bore 26 and then to the port 21'. As soon as the grease gun has been operated to the desired extent to force grease through the machinery to which the cup is applied the grease gun may be disconnected and the check valve will close to hold the grease from flowing backwardly out of the cup. Then at any time the member 2 may be rotated and screwed down upon the member 1 to force the grease in the chamber 11 through the passage 8 to the machine.

Various changes may be made in the details of construction without departing from the spirit of my invention as claimed.

I claim:

1. A grease cup comprising a stationary member, a screw-compression member mounted upon the stationary member and having a grease chamber; said screw-compression member having a screw-threaded bore leading to the grease chamber and a valve seat below the bore and a shell extending inwardly from the valve seat and having ports; a check valve plunger mounted within the shell and having a face to engage the valve seat and a stem extending into the bore, and a spring for operating the plunger.

2. In a grease cup, a head having a vertical opening, a check valve casing fixed in the opening and having a screw-threaded bore and a valve seat below the bore, and a check valve plunger mounted to engage the valve seat and having a stem filling the bore and having ports leading inwardly from the periphery and discharging through the bottom.

3. A grease cup comprising a stationary member, a screw-compression member mounted upon the stationary member and having a grease chamber, said screw-compression member having a bore for connection with a grease gun for filling the grease chamber, and a shell extending inwardly from said bore and having ports, a check valve mounted within the shell and having a face to engage the valve seat and a spring for normally holding the check valve against the valve seat.

In testimony whereof I have signed my name to this specification.

ALBERT A. KLEMS.